United States Patent
Huang

(10) Patent No.: US 6,824,303 B2
(45) Date of Patent: Nov. 30, 2004

(54) APPARATUS FOR BLENDING AND MAKING ICE CREAM

(75) Inventor: Olivia Huang, No. 2, Alley 6, Lane 403, Sec. 3, Chung-Shan Rd., Wu-Tze Hsiang Taichung Hsien (TW)

(73) Assignee: Olivia Huang, Taichung Hsien (TW)

( * ) Notice: Subject to any disclaimer, the term of this patent is extended or adjusted under 35 U.S.C. 154(b) by 85 days.

(21) Appl. No.: 10/404,390

(22) Filed: Apr. 1, 2003

(65) Prior Publication Data

US 2004/0141411 A1 Jul. 22, 2004

(30) Foreign Application Priority Data

Jan. 20, 2003 (TW) ...................................... 92200986 U

(51) Int. Cl.⁷ .......................... A47J 43/06; A47J 43/08; A47J 43/044
(52) U.S. Cl. .......................... 366/204; 366/199; 99/455; 62/342
(58) Field of Search ................................ 366/149, 197, 366/199, 204, 292; 99/348, 452, 455; 62/342, 343

(56) References Cited

U.S. PATENT DOCUMENTS

| | | | | |
|---|---|---|---|---|
| 2,462,089 A | * | 2/1949 | Frisbie ........................ 366/197 |
| 4,070,957 A | * | 1/1978 | Korekawa et al. ............. 99/455 |
| 4,325,643 A | * | 4/1982 | Scott et al. ................. 366/200 |
| 4,693,610 A | * | 9/1987 | Weiss .......................... 366/146 |
| 4,910,973 A | * | 3/1990 | Osrow et al. .................. 62/342 |
| 5,533,805 A | * | 7/1996 | Mandel ....................... 366/285 |
| 5,549,042 A | * | 8/1996 | Bukoschek et al. ........... 99/455 |
| 5,980,099 A | * | 11/1999 | Soon .......................... 366/204 |
| 6,029,564 A | * | 2/2000 | Huang .......................... 99/331 |
| 6,085,645 A | * | 7/2000 | Huang .......................... 99/455 |
| 6,089,747 A | * | 7/2000 | Huang .......................... 366/149 |
| 6,205,806 B1 | * | 3/2001 | Huang .......................... 62/343 |
| 6,250,794 B1 | * | 6/2001 | Huang ........................ 366/149 |
| 6,439,760 B1 | * | 8/2002 | Langeloh et al. ........... 366/206 |

FOREIGN PATENT DOCUMENTS

GB 2287176 A * 9/1995

* cited by examiner

*Primary Examiner*—Charles E. Cooley
(74) *Attorney, Agent, or Firm*—Merchant & Gould P.C.

(57) ABSTRACT

An apparatus for blending and for making ice cream includes drive, blending, and stirring units. The drive unit includes a high-speed output gear unit driven rotatably by a drive shaft and formed with a first engaging hole that extends along a rotary axis, a speed-reduction gear unit driven rotatably by the drive shaft, and a low-speed output gear unit driven rotatably by the speed-reduction gear unit and formed with a second engaging hole that is coaxial with the first engaging hole. The blending unit engages removably the first engaging hole and is driven by the drive unit to rotate about the rotary axis at a higher speed. The stirring unit engages removably the second engaging hole and is driven by the drive unit to rotate about the rotary axis at a lower speed.

8 Claims, 8 Drawing Sheets

US 6,824,303 B2

APPARATUS FOR BLENDING AND MAKING ICE CREAM

CROSS-REFERENCE TO RELATED APPLICATION

This application claims priority of Taiwanese application no. 092200986, filed on Jan. 20, 2003.

BACKGROUND OF THE INVENTION

1. Field of the Invention

The invention relates to a food processing apparatus, more particularly to an apparatus suitable for blending and for making ice cream.

2. Description of the Related Art

As shown in FIG. 1, a conventional ice cream making machine includes a stand 1, a refrigerant container unit 2 mounted on top of the stand 1, a drive unit 3 mounted on top of the container unit 2, and a stirring unit 4 coupled to and driven by the drive unit 3. The requirements of keeping the container unit 2 at a low temperature and low-speed stirring by the stirring unit 4 are essential for ice cream making. Accordingly, the container unit 2 includes an inner barrel 201 for receiving material for making ice cream, and the drive unit 3 is operable so as to enable the stirring unit 4 to stir the material in the inner barrel 201 at a low speed in order to slowly form the ice cream.

On the other hand, a conventional blender is used to process vegetables or fruits through a blade unit thereof at a relatively high speed.

The aforesaid ice cream making machine and blender operate at two different speeds, thereby providing entirely different food processing functionalities. As such, consumers must purchase an ice cream making machine and a blender individually to have both blending and ice cream making effects.

SUMMARY OF THE INVENTION

Therefore, the object of the present invention is to provide a single apparatus suitable for blending and for making ice cream.

Accordingly, an apparatus for blending and for making ice cream of this invention comprises a drive unit, and a blending unit and a stirring unit that selectively and removably engage the drive unit.

The drive unit includes a casing, a motor mounted in the casing, a drive shaft disposed in the casing and coupled to and driven rotatably by the motor, and a high-speed output gear unit, a speed-reduction gear unit, and a low-speed output gear unit disposed in the casing. The high-speed output gear unit is coupled directly to and is driven rotatably by the drive shaft, and is formed with a first engaging hole that extends along a rotary axis. The speed-reduction gear unit is coupled to and is driven rotatably by the drive shaft. The low-speed output gear unit is coupled to and is driven rotatably by the speed-reduction gear unit, and is formed with a second engaging hole that is coaxial with the first engaging hole. The casing is formed with an insert hole that is registered with the first and second engaging holes.

The blending unit includes a blending axle having a mounting end inserted removably into the insert hole and configured to engage removably the first engaging hole in the high-speed output gear unit, and an opposite end mounted with a blade set. The blending unit is driven by the drive unit to rotate about the rotary axis at a first speed when coupled to the high-speed output gear unit.

The stirring unit includes a stirring axle having a mounting end inserted removably into the insert hole and configured to engage removably the second engaging hole in the low-speed output gear unit, and a stirring paddle set mounted on the stirring axle. The stirring unit is driven by the drive unit to rotate about the rotary axis at a second speed slower than the first speed when coupled to the low-speed output gear unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
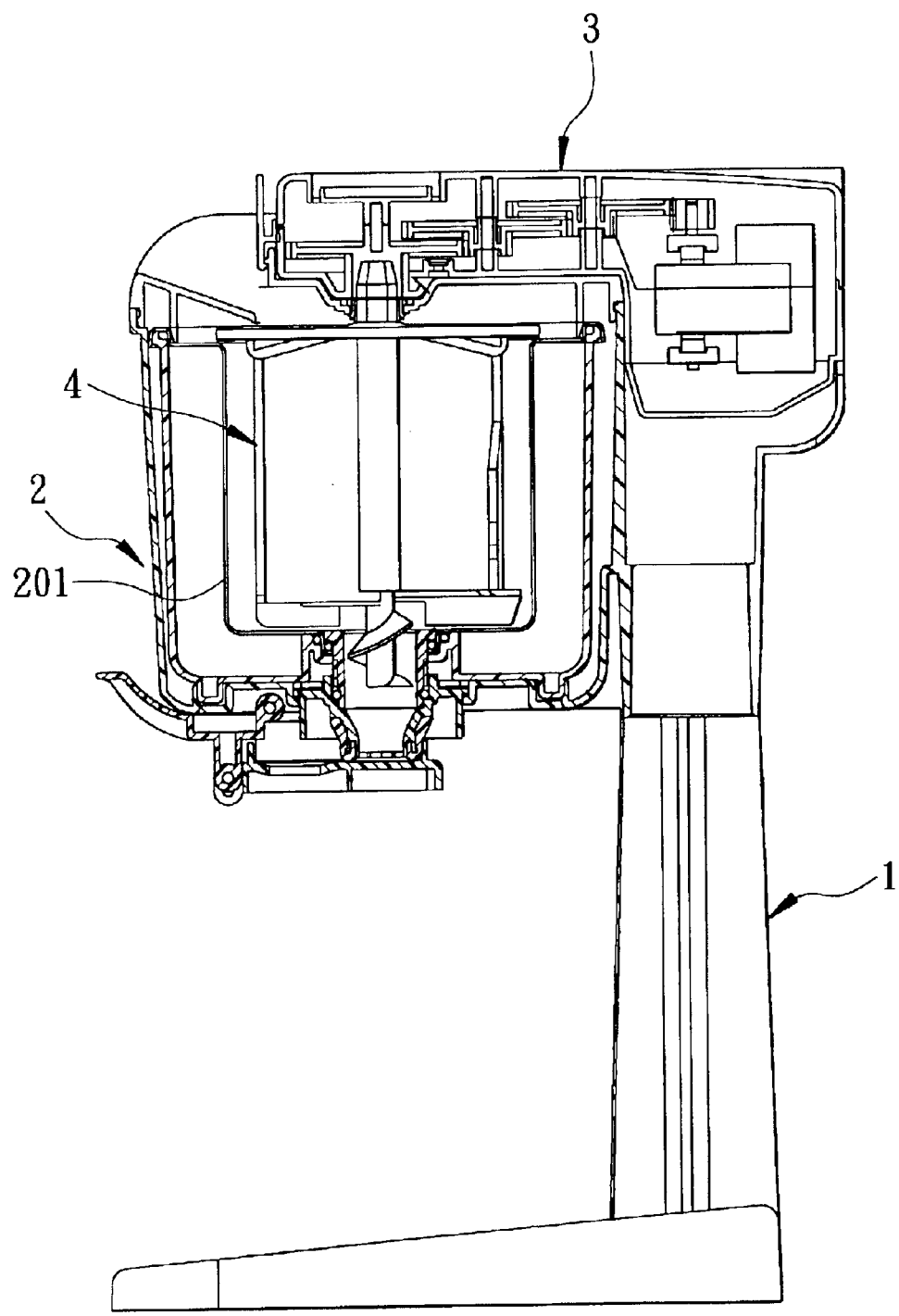
FIG. 1 is a schematic, partly sectional view of a conventional ice cream making machine.
Figure 2:
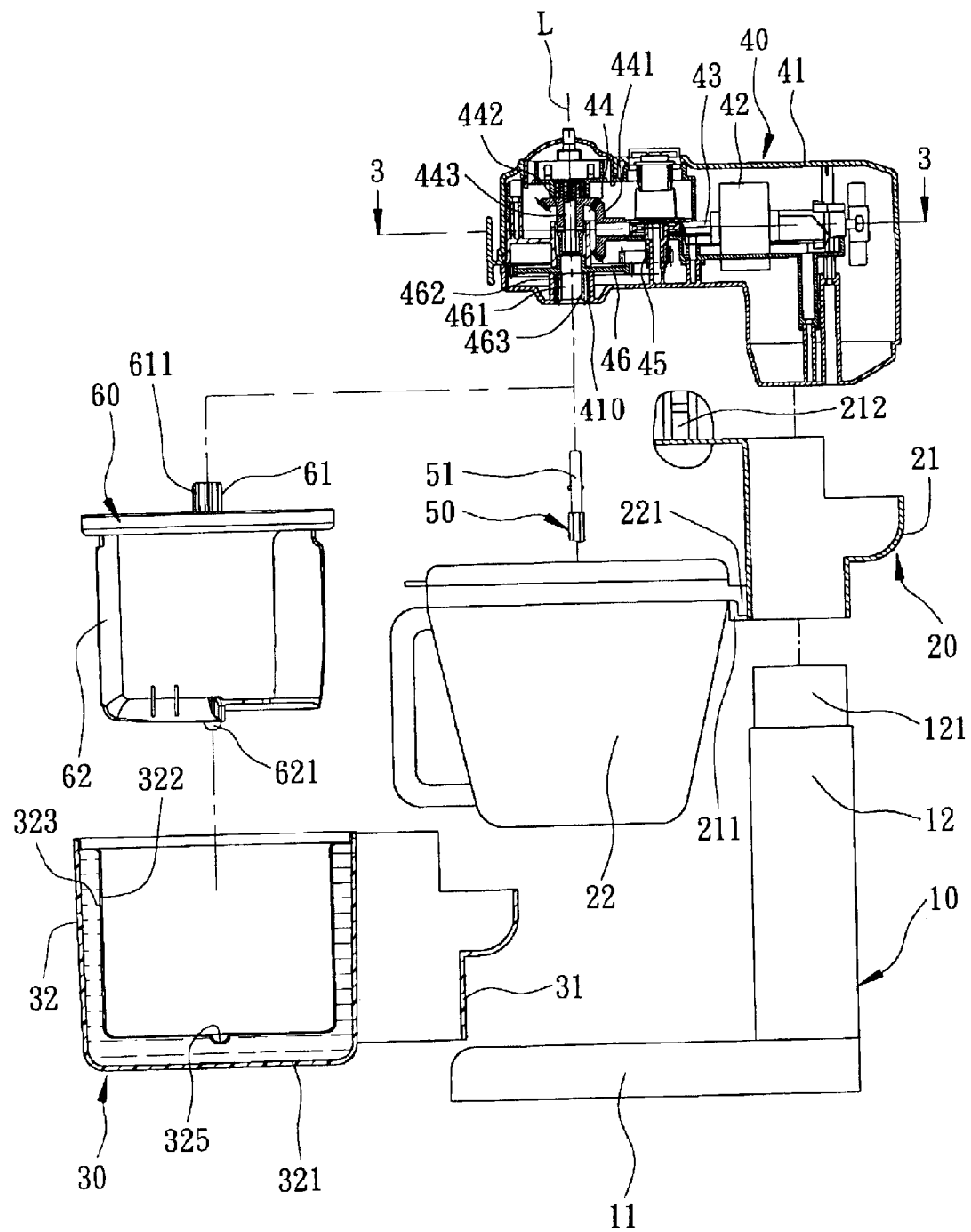
FIG. 2 is an exploded, schematic, partly sectional view of the preferred embodiment of an apparatus for blending and for making ice cream according to the present invention.

Referring to FIG. 2, the preferred embodiment of an apparatus for blending and for making ice cream according to the present invention is shown to include a stand 10, a first container device 20 and a second container device 30 that can be mounted selectively and removably on top of the stand 10, a drive unit 40 that can be mounted on top of either the first container device 20 or the second container device 30, and a blending unit 50 and a stirring unit 60 that can be selectively and removably coupled to the drive unit 40.

The stand 10 has a bottom section 11 to be placed on a table surface, and a top section 12 opposite to the bottom section 11. A coupling post 121 extends uprightly from the top section 12 of the stand 10.

Figure 5:
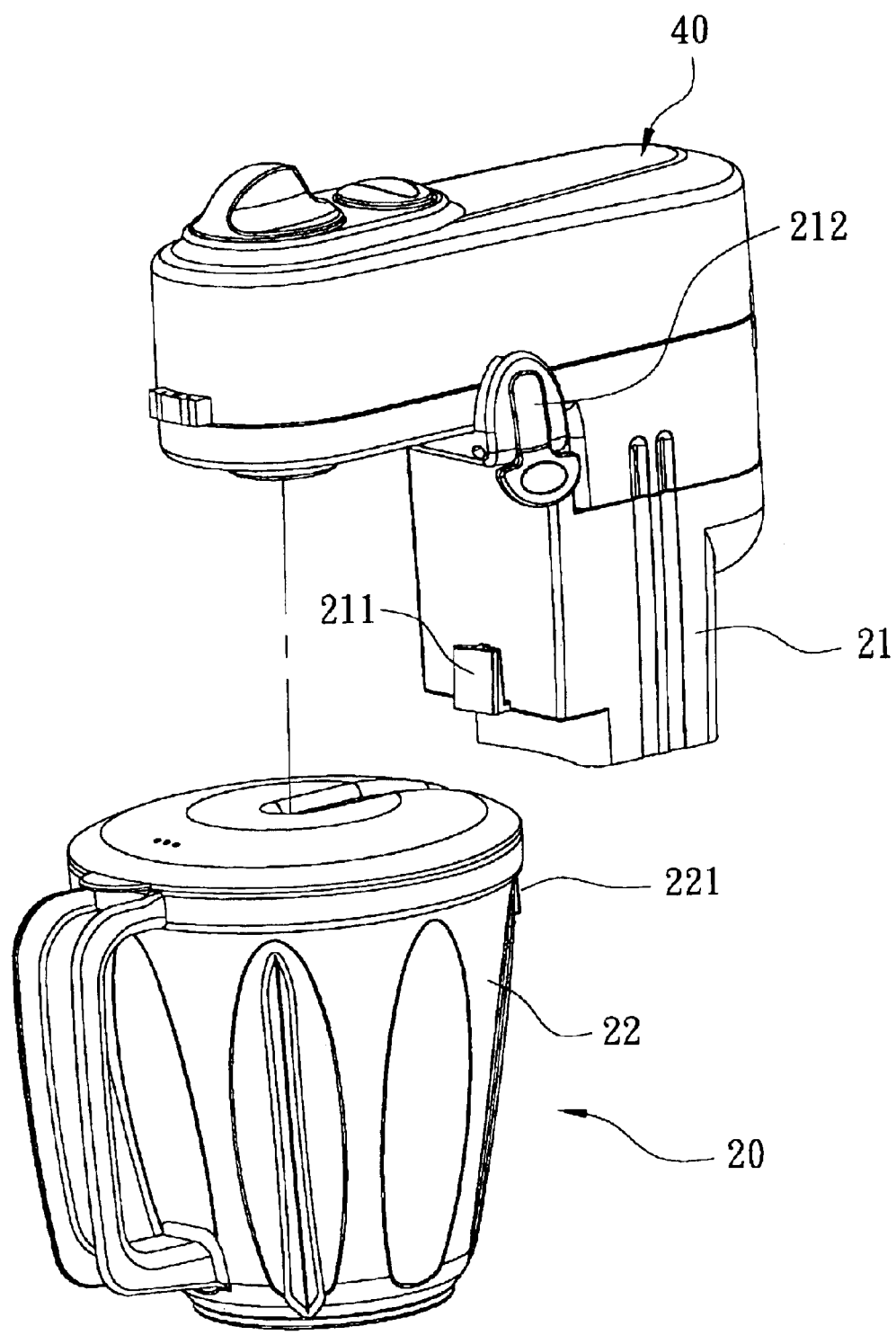
FIG. 5 is a partly assembled, perspective view illustrating a first container device and a drive unit of the preferred embodiment.
Figure 6:
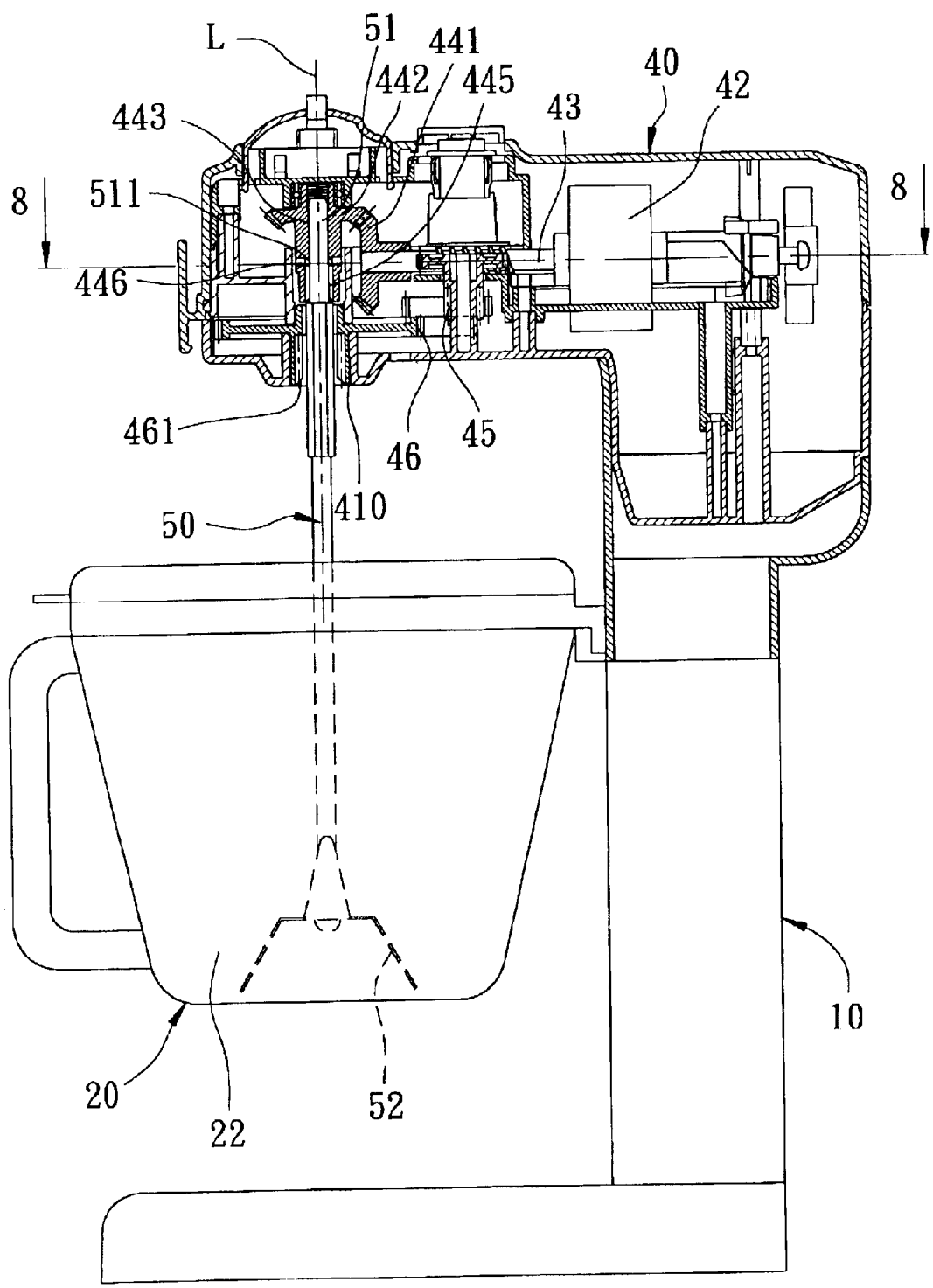
FIG. 6 is a schematic, partly sectional view of the preferred embodiment when used for blending.

With reference to FIGS. 2, 5 and 6, the first container device 20 is used when the apparatus is operated in a blending mode, and includes a coupling member 21 sleeved removably on the coupling post 121 at the top section 12 of the stand 10, and a container 22 connected removably to the coupling member 21. The coupling member 21 has a lateral side with an L-shaped hook member 211 protruding therefrom, and a top portion provided with a pair of fastening members 212. The container 22 has an outer wall surface formed with an inverted L-shaped fastener 221 to interlock removably with the hook member 211.

Figure 7:
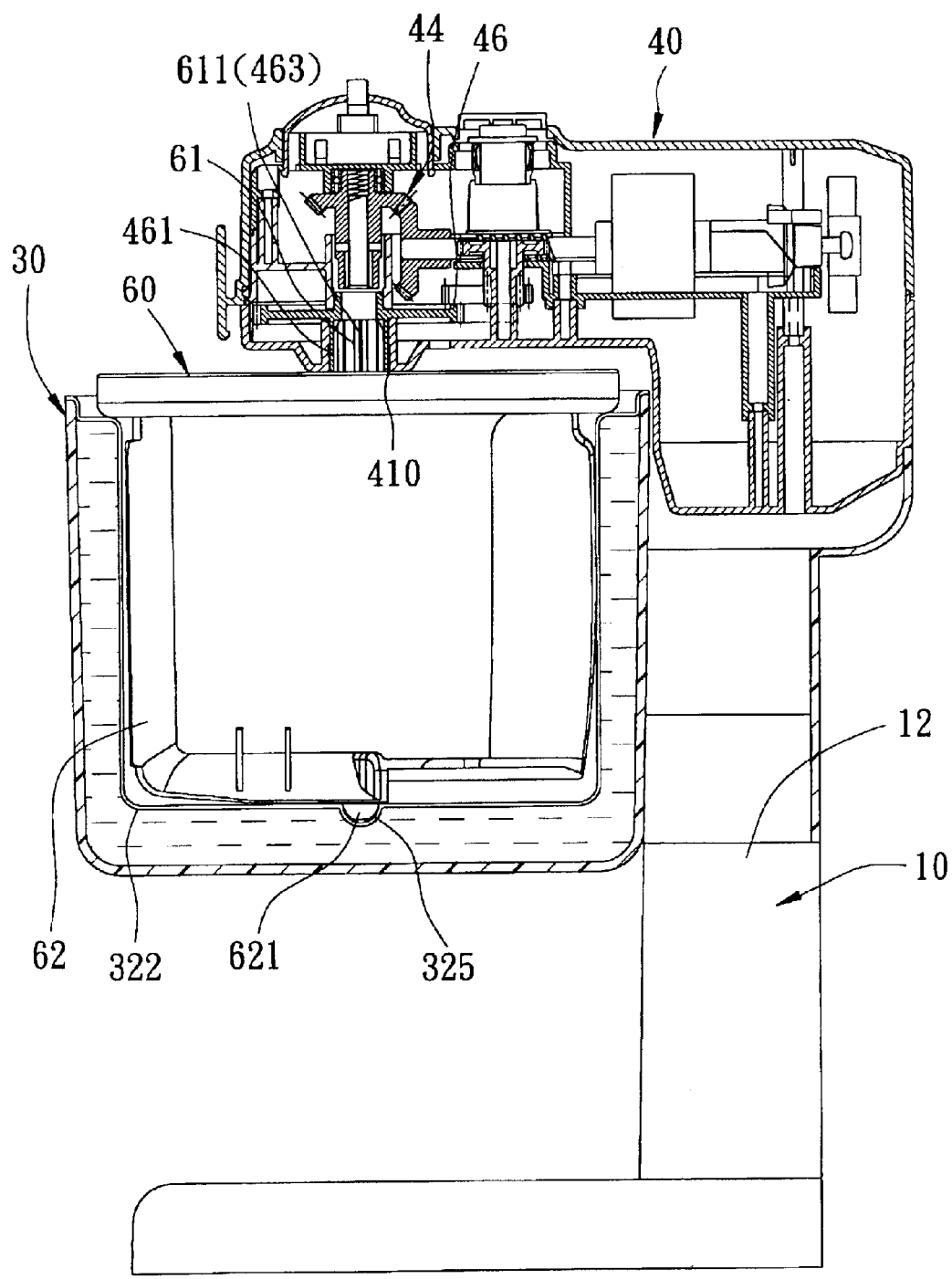
FIG. 7 is a schematic, partly sectional view of the preferred embodiment when used for making ice cream.

Referring to FIGS. 2 and 7, the second container device 30 is used when the apparatus is operated in an ice cream making mode, and includes a coupling member 31 sleeved removably on the coupling post 121 at the top section 12 of the stand 10, and a container unit 32. The container unit 32 includes an outer barrel 321 connected fixedly to the coupling member 31, an inner barrel 322 disposed in the outer barrel 321 and cooperating with the outer barrel 321 to confine a sealed space for receiving a refrigerant 323 therein, and a cover (not shown) for covering an open top side of the outer barrel 321. The inner barrel 322 has a bottom wall formed with a central recess 325.

Figure 3:
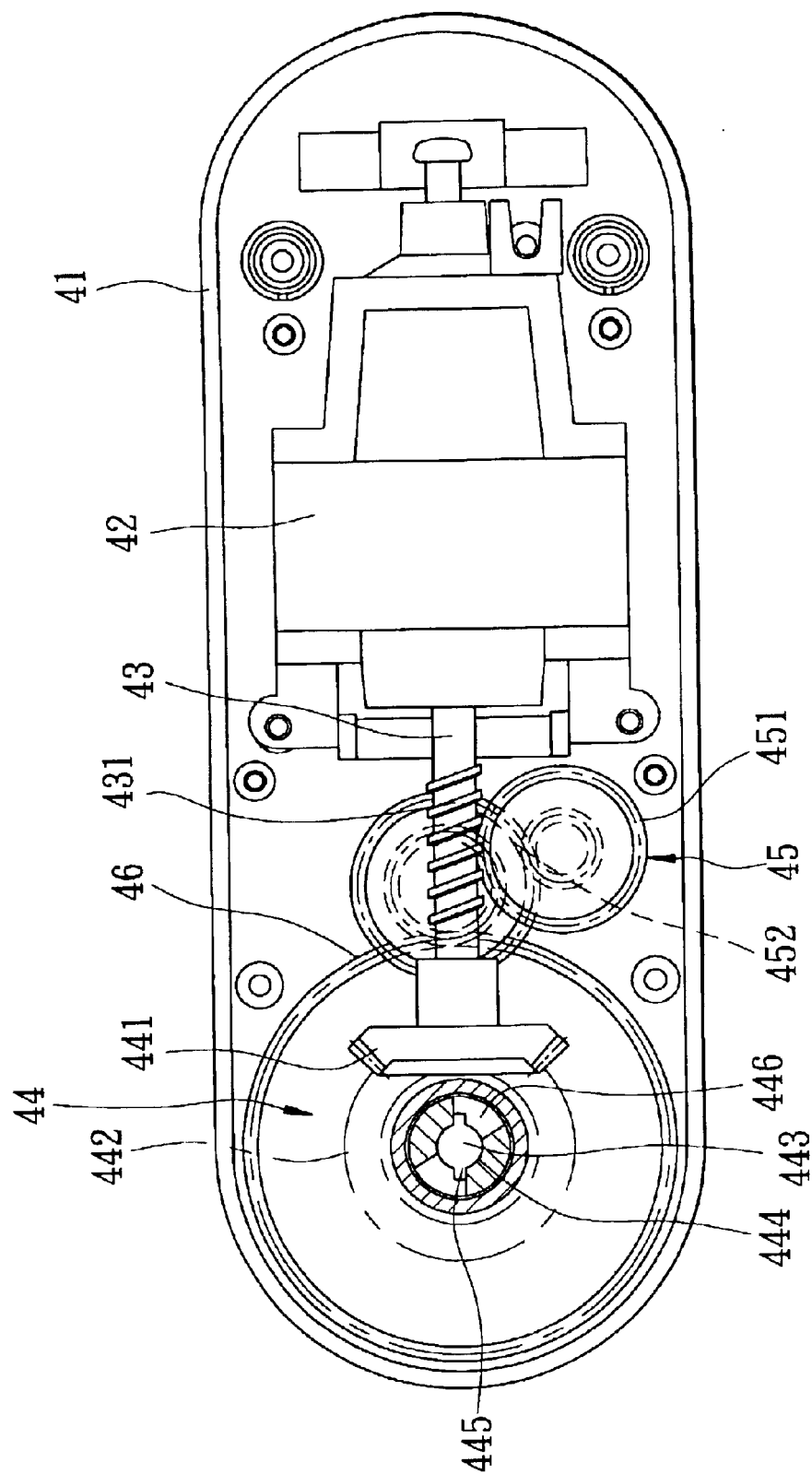
FIG. 3 is a schematic cross-sectional view taken along line 3—3 of FIG. 2.
Figure 4:
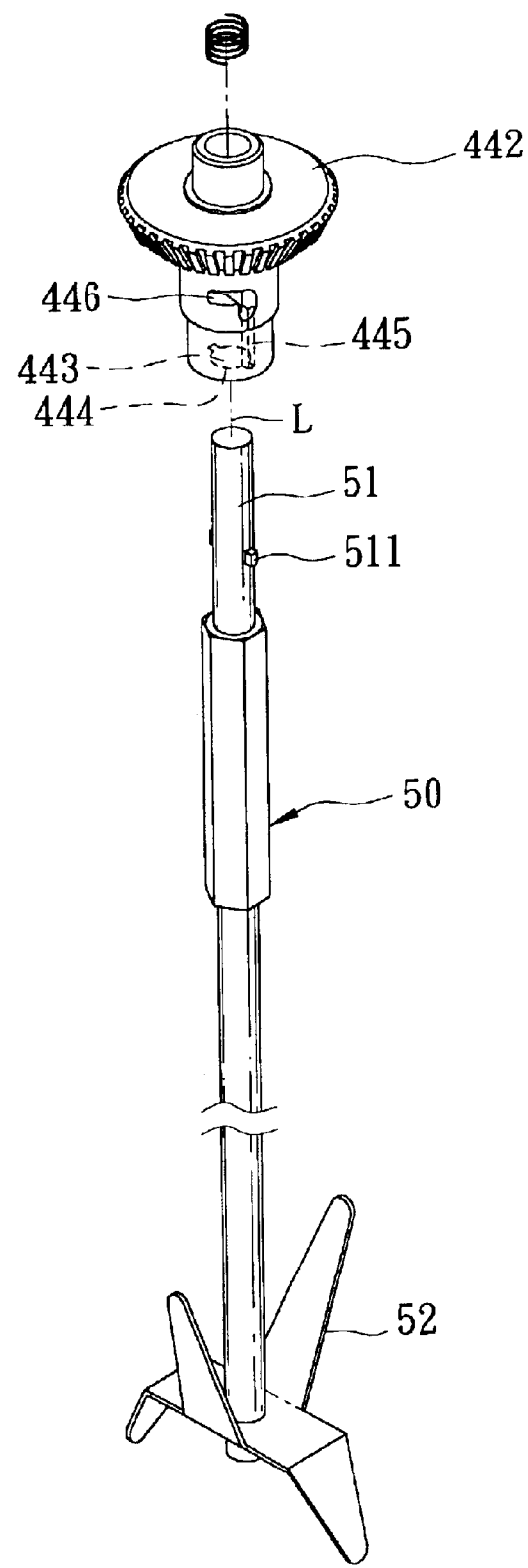
FIG. 4 is an exploded perspective view illustrating a bevel gear and a blending unit of the preferred embodiment.

Referring to FIGS. 2 and 3, the drive unit 40 includes a casing 41 mounted removably on either one of the coupling members 21, 31, a motor 42 mounted in the casing 41, a horizontally extending drive shaft 43 disposed in the casing 41 and coupled to and driven rotatably by the motor 42, a high-speed output gear unit 44 disposed in the casing 41 and coupled directly to and driven rotatably by the drive shaft 43, a speed-reduction gear unit 45 disposed in the casing 41 and coupled to and driven rotatably by the drive shaft 43, and a low-speed output gear unit 46 disposed in the casing 41 and coupled to and driven rotatably by the speed-reduction gear unit 45. In this embodiment, the casing 41 can be locked removably to the coupling member 21 in a known manner through the fastening members 212. The high-speed output gear unit 44 includes a first bevel gear 441 mounted on one end of the drive shaft 43, and a second bevel gear 442 disposed rotatably in the casing 41 and meshing with the first bevel gear 441. The second bevel gear 442 is formed with a first engaging hole 443 that extends along a rotary axis (L) transverse to the drive shaft 43, and has a hole-defining surface 444 that defines the first engaging hole 443. With further reference to FIG. 4, in this embodiment, the hole-defining surface 444 is formed with a pair of axially extending slide grooves 445 and a pair of radially extending engaging grooves 446 that intersect the slide grooves 445, respectively. As best shown in FIG. 3, the speed-reduction gear unit 45 includes a worm section 431 formed directly on the drive shaft 43, a worm gear 451 meshing with the worm section 431, and a speed-reduction gear set 452 meshing with the worm gear 451 and the low-speed output gear unit 46. Referring once again to FIG. 2, the low-speed output gear unit 46 is formed with a second engaging hole 461 that is coaxial with the first engaging hole 443, and has a hole-defining surface 462 that defines the second engaging hole 461. In this embodiment, the second engaging hole 461 is disposed below the first engaging hole 443 relative to the rotary axis (L), and has a larger diameter than the first engaging hole 443. The arrangement as such results in a compact structure for the drive unit 40. The hole-defining surface 462 is formed with a plurality of axially extending splines 463. In addition, the casing 41 has a bottom wall formed with an insert hole 410 (see FIG. 2) that is registered with the first and second engaging holes 443, 461.

Referring to FIGS. 4 and 6, the blending unit 50 is used together with the first container device 20 when the apparatus is operated in the blending mode, and includes a blending axle 51 having a mounting end inserted removably into the insert hole 410 and configured to engage removably the first engaging hole 443 in the high-speed output gear unit 44, and an opposite end mounted with a blade set 52 that is to be extended into the container 22. In this embodiment, the mounting end of the blending axle 51 is formed with a pair of radial key projections 511, each of which is slidable along a respective one of the slide grooves 445 and into a respective one of the engaging grooves 446 so as to couple removably the blending unit 50 to the second bevel gear 442 of the high-speed output gear unit 44. Accordingly, the blending unit 50 can be driven by the drive unit 40 to rotate about the rotary axis (L) at a first speed when coupled to the high-speed output gear unit 44.

As shown in FIGS. 2 and 7, the stirring unit 60 is used together with the second container device 30 when the apparatus is operated in the ice cream making mode, and includes a stirring axle 61 having a mounting end inserted removably into the insert hole 410 and configured to engage removably the second engaging hole 461 in the low-speed output gear unit 46, and a stirring paddle set 62, in the form of a hollow frame, mounted on the stirring axle 61. The mounting end of the stirring axle 61 is formed as a splined shaft 611 that engages the splines 463 in the second engaging hole 461 of the low-speed output gear unit 46. Thus, the stirring unit 60 can be driven by the drive unit 40 to rotate about the rotary axis (L) at a second speed slower than the first speed when coupled to the low-speed output gear unit 46. The stirring paddle set 62 is to be disposed in the inner barrel 322, and has a bottom part formed with a stub 621 that is to be disposed in the central recess 325.

Figure 8:
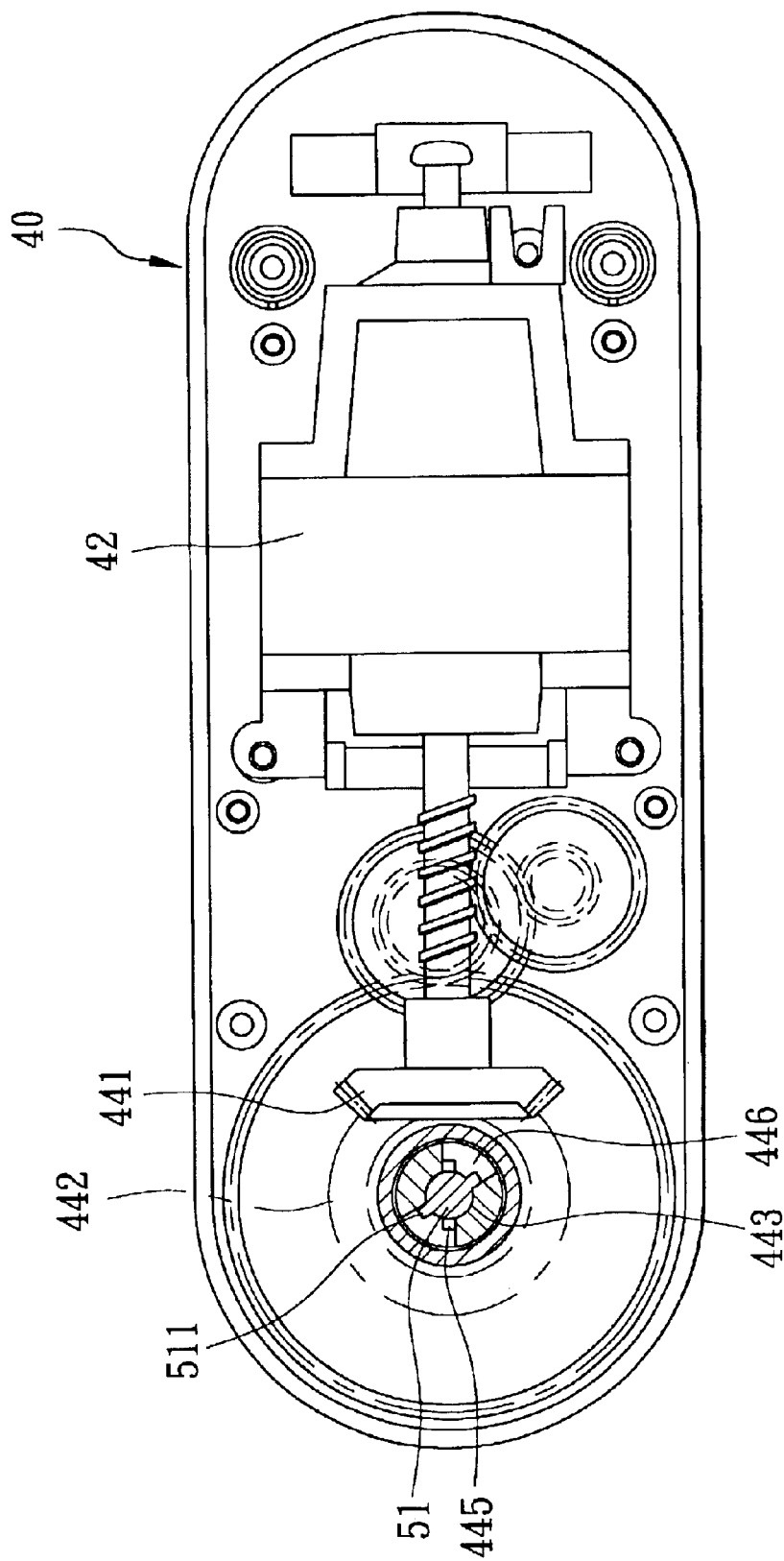
FIG. 8 is a schematic, cross-sectional view taken along line 8—8 of FIG. 6.

Referring to FIGS. 6 and 8, to operate the apparatus in the blending mode, the first container device 20 is mounted on the stand 10, and the drive unit 40 is connected to the first container device 20. The blending unit 50 is then connected to the drive unit 40 in the manner described hereinabove. Because the second engaging hole 461 is larger than the first engaging hole 443, engagement between the mounting end of the blending axle 51 and the first engaging hole 443 will not be hindered by the second engaging hole 443. When the motor 42 is activated, the drive shaft 43 drives directly the first bevel gear 441, and the second bevel gear 442 and the blending unit 50 are driven in turn to rotate about the rotary axis (L) at the first speed, such as 20000 rpm, so that food in the container 22 of the first container device 20 will be processed by the blade set 52 of the blending unit 50. The fastening members 212 ensure firm engagement between the drive unit 40 and the first container device 20 when the apparatus is operated in the blending mode.

During the aforesaid blending operation, it is noted that the low-speed output gear unit 46 does not engage the blending unit 50. Therefore, the speed-reduction gear unit 45 and the low-speed output gear unit 46 rotate idly at this time.

As shown in FIG. 7, to operate the apparatus in the ice cream making mode, the second container device 30 is mounted on the stand 10, and the drive unit 40 is mounted on the second container device 30. The stirring unit 60 is then connected to the drive unit 40 in the manner described hereinabove. When the motor 42 is activated, the drive shaft 43 drives the stirring unit 60 through the speed-reduction gear unit 45 and the low-speed output gear unit 46 so as to rotate about the rotary axis (L) at the second speed, such as 60 rpm, and so that the stirring paddle set 62 can stir material in the inner barrel 322 to form ice cream in a conventional manner.

During the aforesaid ice cream making operation, it is noted that the high-speed output gear unit 44 does not engage the stirring unit 60. Therefore, the high-speed output gear unit 44 rotates idly at this time.

In summary, the apparatus of this invention combines the functionalities of a blender and an ice cream making apparatus into a single machine, thereby resulting in convenience and cost savings for consumers.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for blending juice and making ice cream, comprising:

a drive unit including
   a casing,
   a motor mounted in said casing,
   a drive shaft disposed in said casing and coupled to and driven rotatably by said motor,
   a high-speed output gear unit disposed in said casing, coupled directly to and driven rotatably by said drive shaft, and formed with a first engaging hole that extends along a rotary axis,
   a speed-reduction gear unit disposed in said casing and coupled to and driven rotatably by said drive shaft, and
   a low-speed output gear unit disposed in said casing, coupled to and driven rotatably by said speed-reduction gear unit, and formed with a second engaging hole that is coaxial with said first engaging hole,
   said casing being formed with an insert hole that is registered with said first and second engaging holes; and a blending unit and a stirring unit that selectively and removably engage said drive unit;

said blending unit including a blending axle having a mounting end inserted removably into said insert hole and configured to engage removably said first engaging hole in said high-speed output gear unit, and an opposite end mounted with a blade set, said blending unit being driven by said drive unit to rotate about said rotary axis at a first speed when coupled to said high-speed output gear unit;

said stirring unit including a stirring axle having a mounting end inserted removably into said insert hole and configured to engage removably said second engaging hole in said low-speed output gear unit, and a stirring paddle set mounted on said stirring axle, said stirring unit being driven by said drive unit to rotate about said rotary axis at a second speed slower than the first speed when coupled to said low-speed output gear unit.

2. The apparatus as claimed in claim 1, wherein said high-speed output gear unit includes a first bevel gear mounted on said drive shaft, and a second bevel gear meshing with said first bevel gear and formed with said first engaging hole, said second bevel gear having a hole-defining surface that defines said first engaging hole, said hole-defining surface being formed with an axially extending slide groove and a radially extending engaging groove that intersects said slide grove, said mounting end of said blending axle being formed with a radial key projection that is slidable along said slide groove and into said engaging groove so as to couple removably said blending unit to said second bevel gear.

3. The apparatus as claimed in claim 1, wherein said mounting end of said stirring axle is formed as a splined shaft that engages removably said second engaging hole.

4. The apparatus as claimed in claim 1, wherein said second engaging hole is disposed below said first engaging hole relative to said rotary axis and has a larger diameter than said first engaging hole.

5. The apparatus as claimed in claim 1, wherein said speed-reduction gear unit includes a worm section on said drive shaft, a worm gear meshing with said worm section, and a speed-reduction gear set meshing with said worm gear and said low-speed output gear unit.

6. The apparatus as claimed in claim 1, further comprising a stand having a bottom section and a top section opposite to said bottom section, and a coupling member sleeved removably on said top section of said stand, said casing being mounted removably on said coupling member.

7. The apparatus as claimed in claim 6, further comprising a container connected removably to said coupling member.

8. The apparatus as claimed in claim 6, further comprising a container unit that includes an outer barrel connected fixedly to said coupling member, and an inner barrel disposed in said outer barrel and cooperating with said outer barrel to confine a sealed space for receiving a refrigerant therein.

* * * * *